Jan. 5, 1954 T. A. FEENEY ET AL 2,665,084
FLAP ACTUATOR AND CONTROL SYSTEM
Filed Nov. 14, 1949 9 Sheets-Sheet 2
Fig. 2
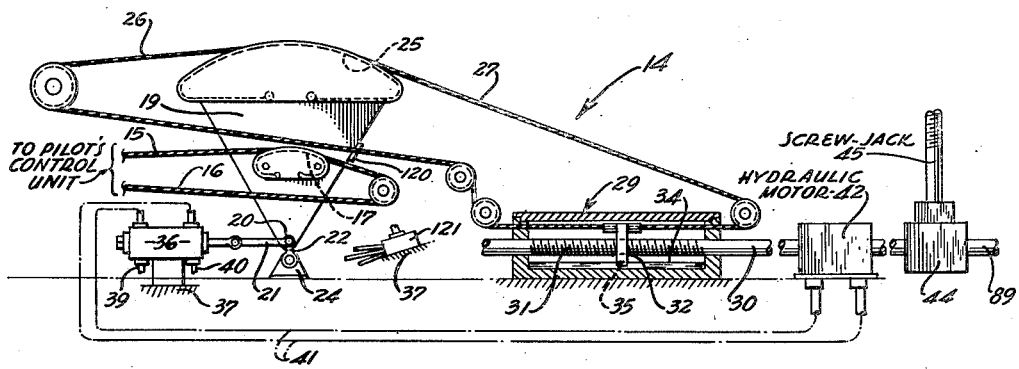
Fig. 5
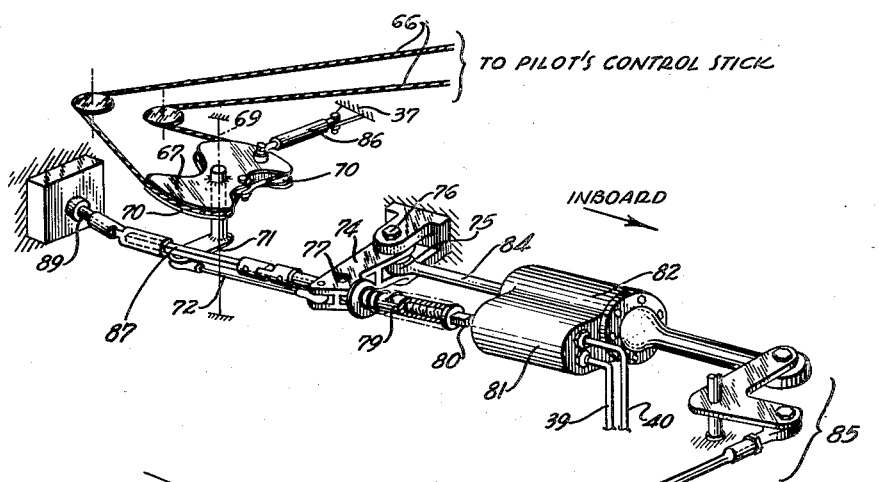
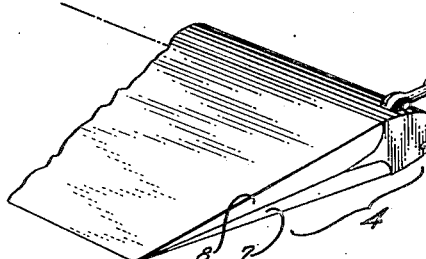
INVENTORS:
THOMAS A. FEENEY
JOHN E. GLENN
WALTER B. DEGENFELDER
RONALD E. CRANDALL
HERBERT S. RIPLEY
BY
ATTORNEY

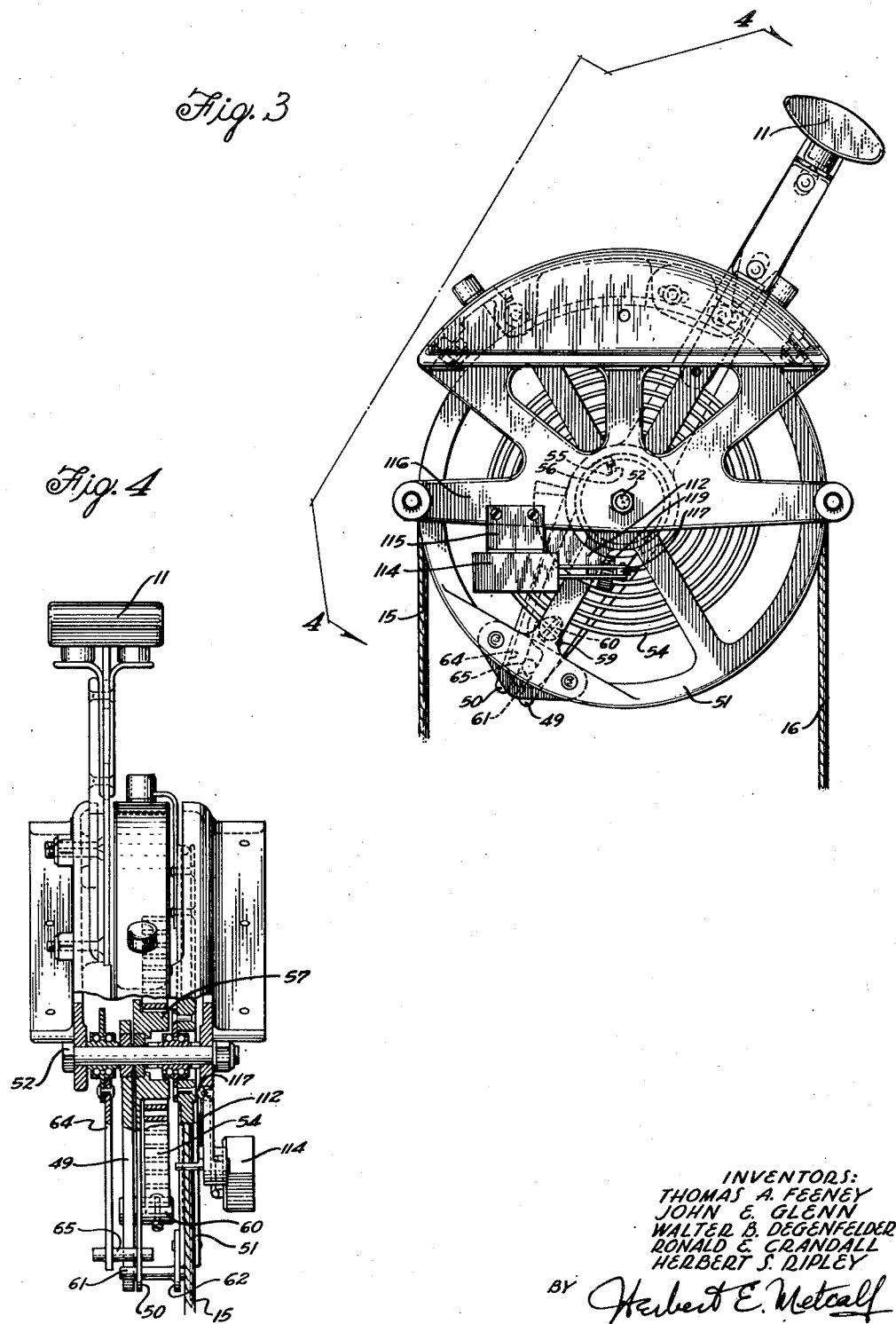

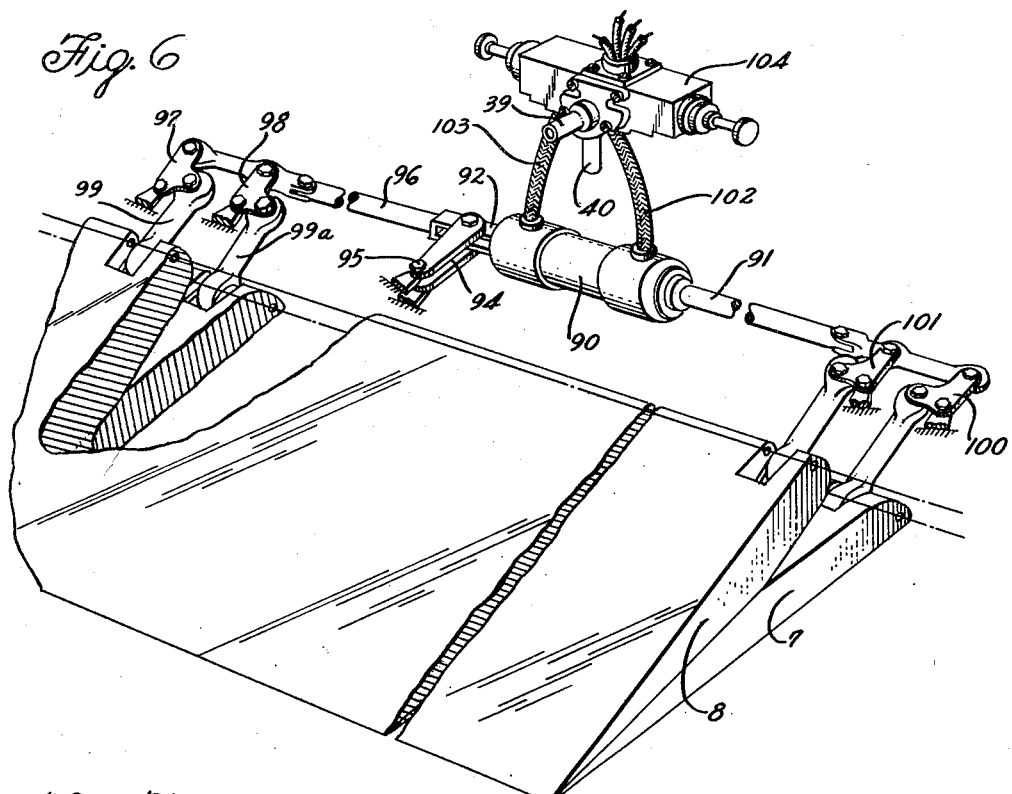
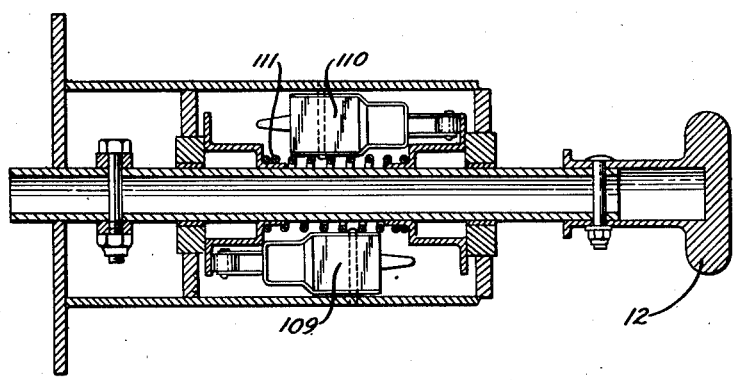

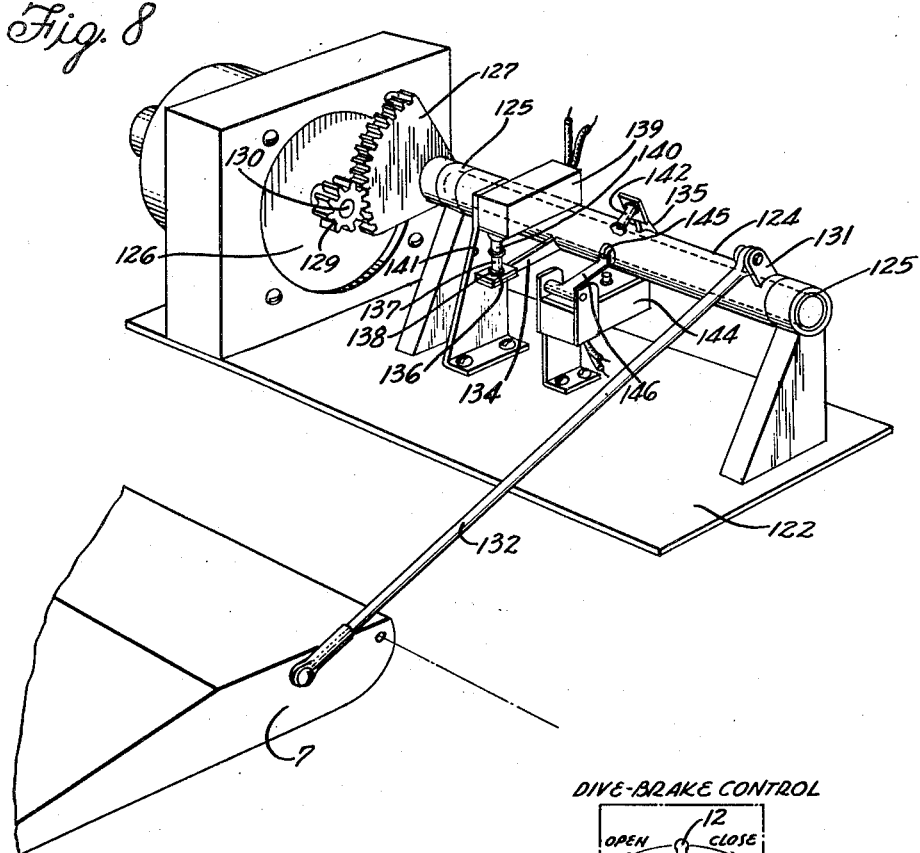
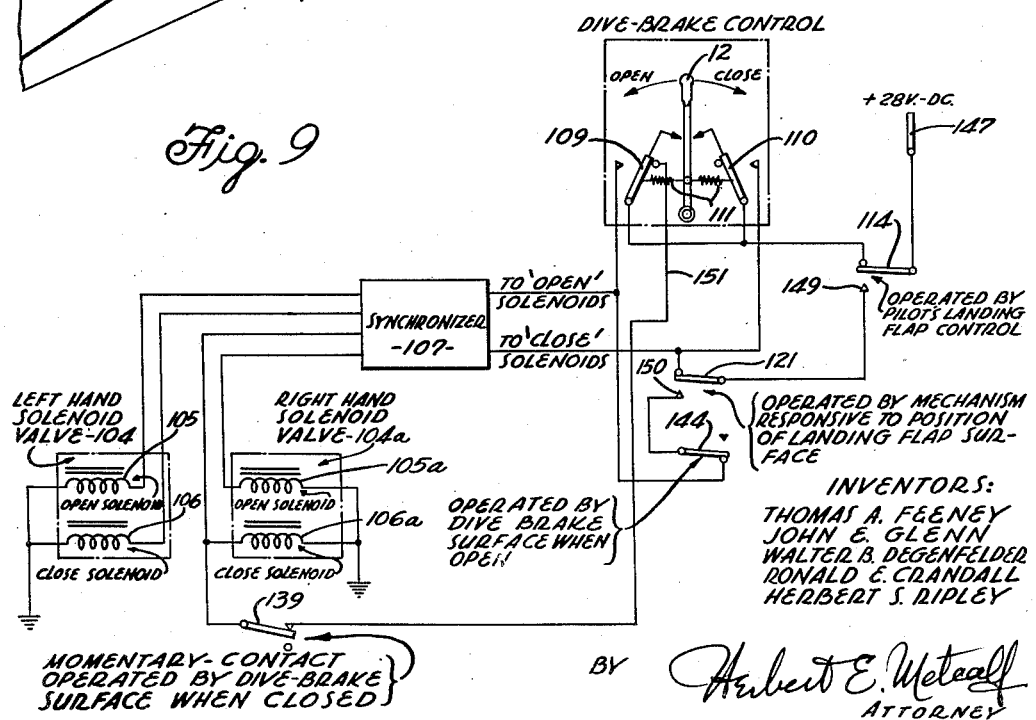

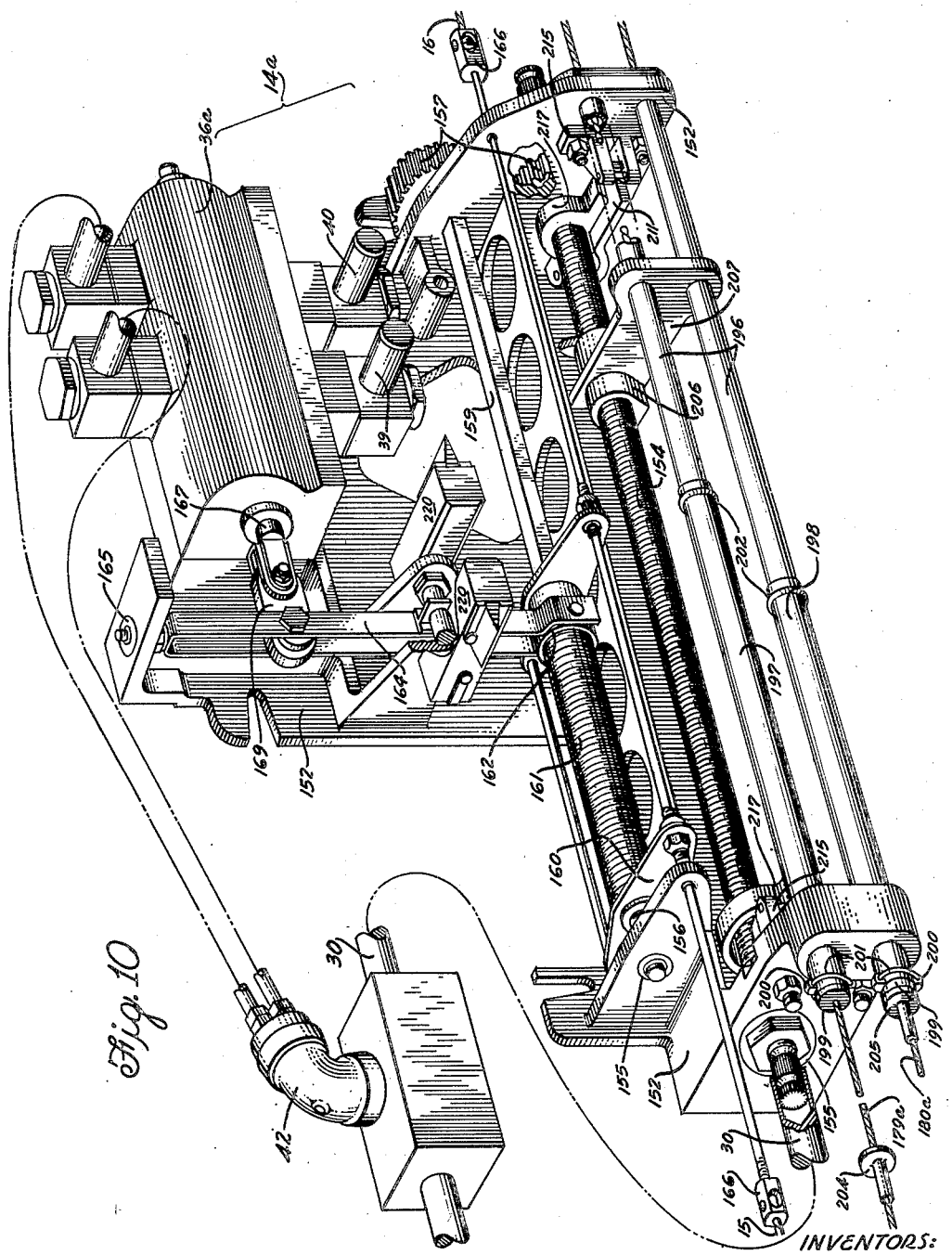

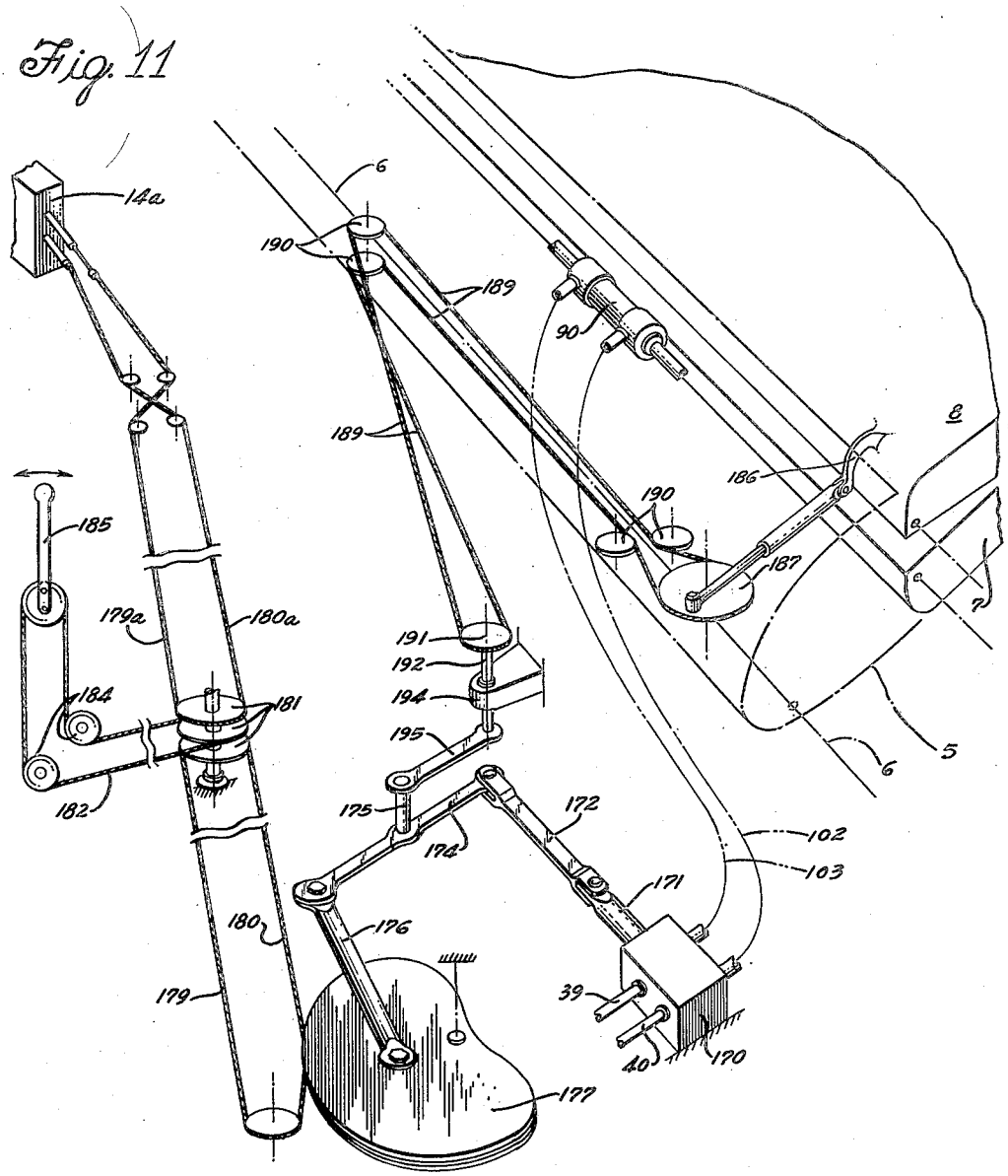

Jan. 5, 1954  T. A. FEENEY ET AL  2,665,084
FLAP ACTUATOR AND CONTROL SYSTEM
Filed Nov. 14, 1949  9 Sheets-Sheet 8

INVENTORS:
THOMAS A. FEENEY
JOHN E. GLENN
WALTER B. DEGENFELDER
RONALD E. CRANDALL
HERBERT S. RIPLEY
BY Herbert E. Metcalf
ATTORNEY

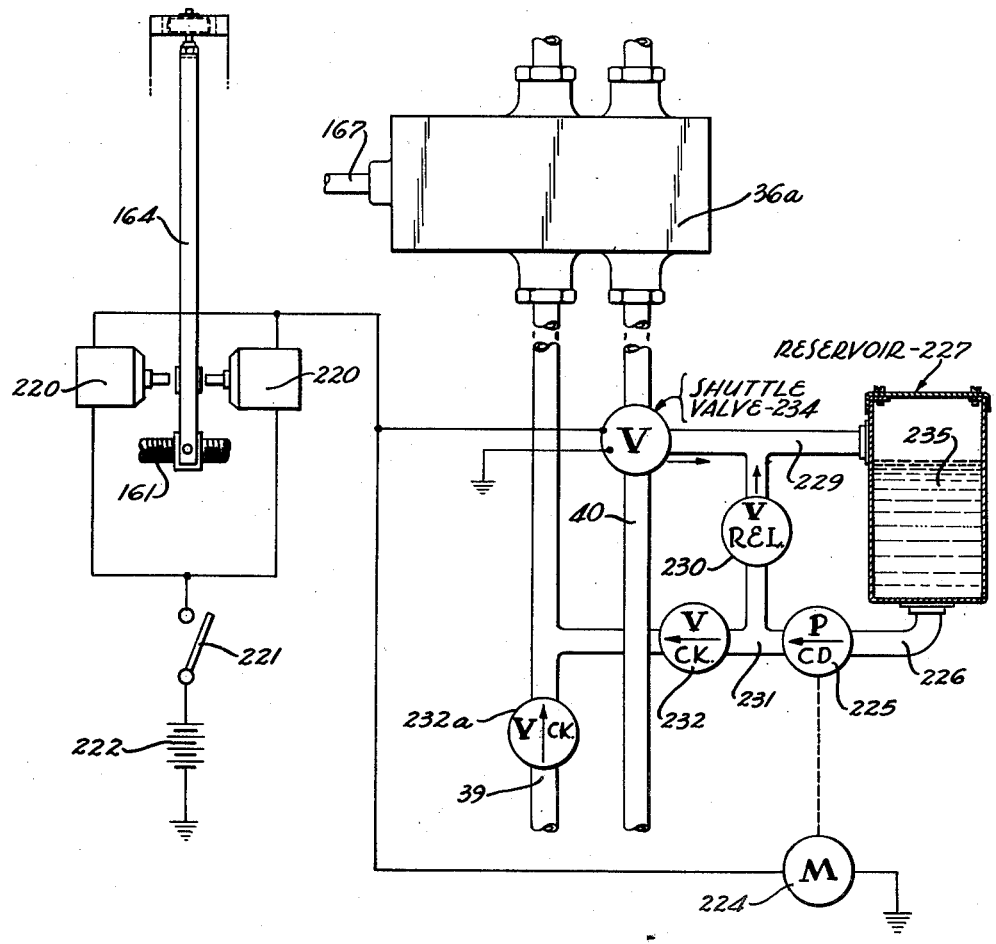

Patented Jan. 5, 1954

2,665,084

UNITED STATES PATENT OFFICE 2,665,084

FLAP ACTUATOR AND CONTROL SYSTEM

Thomas A. Feeney and John E. Glenn, Los Angeles, Walter B. Degenfelder, Wilmington, Ronald E. Crandall, Los Angeles, and Herbert S. Ripley, Inglewood, Calif., assignors to Northrop Aircraft, Inc., Hawthorne, Calif., a corporation of California Application November 14, 1949, Serial No. 127,062

14 Claims. (Cl. 244—42)

This invention relates to airplanes, and, more particularly, to control means and combinations of control means for operating a number of control surfaces under full power, primarily to secure more efficient high-lift configurations.

Auxiliary control surfaces on an airplane, such as landing flaps, dive brakes, and the like, can be controlled and operated through power operated mechanisms having a position follow-up connection with the operated surface so that various incremental stationary positions can be selected, these surface positions being in accordance with the setting of the respective control element, as for example, is shown in the copending application of Hill, Serial Number 3,192 filed January 20, 1948 now U. S. Pat. No. 2,609,165, issued September 2, 1952. Recently, means have also been devised to actuate the primary attitude control surfaces also by full power, i. e., with no surface load feed-back to the pilot, such as shown, described, and claimed in the copending application of Feeney, Serial No. 23,567, filed April 27, 1948 now abandoned.

Since, with a full power system, erratically varying hinge moments produced at the controlled surface do not cause variation of the control forces applied by the pilot, two or more control functions may be combined in a single surface, with separate handles or other control elements for each function. For example, a mechanism to attain simultaneous lowering of each aileron for landing flap purposes is shown, described, and claimed in another copending application, Serial No. 57,518, filed October 30, 1948, and a novel arrangement of combined surfaces is likewise disclosed in still another copending application, Serial No. 59,848 filed November 13, 1948 now U. S. Pat. No. 2,612,329, issued September 30, 1952.

Utilizing the advantages of full power operated surface controls, the present invention comprises certain novel means for interconnecting the operation of a high-lift landing flap with separate power means normally used for operating additional control surfaces, while at the same time retaining all the individual controls in operative condition. It is an object of the present invention to provide a flap actuating mechanism which will, in addition to extending a landing flap, cause simultaneous lowering of the aileron surfaces on each side of the airplane, and cause the simultaneous opening of dive brake surfaces on each side of the airplane, all without changing any existing operating force relations of the pilot's controls, or the normal operating motions thereof.

In the event the flap power supply should fail, due to an engine failure or other reason, it would still be desirable to be able to operate the flaps, and it is another object of this invention to provide an emergency source of power which can be ready to operate the flaps through the original control mechanism if the main system power becomes inoperative.

Another possibility of failure, especially in a military airplane, is that the control system may become damaged, during actual movement of the flaps, in such a manner that the normal shut-off of power would fail to operate, so that the flaps might continue extending, for example, until forced completely off the airplane. Therefore, still another object of this invention is to provide a flap control system having emergency stopping means acting to positively halt the flap travel at both extremes if the power means has not been deenergized at the proper position.

Other objects and features of advantage will be noted in the detailed description of specific apparatus which follows, described with reference to the accompanying drawings, shown solely by way of illustration and not by way of limitation, wherein:

Figure 2 is a diagrammatic view partly in plan and partly in longitudinal section showing one type of a landing flap control and follow-up system.

Figure 3 is a right side view of a pilot's landing flap control unit.

Figure 4 is a rear view of the same pilot's unit, taken as indicated by the line 4—4 in Figure 3.

Figure 5 is a perspective view showing the aileron operating mechanism of the airplane in Figure 1.

Figure 6 is a diagrammatic view showing one form of dive brake operating mechanism for the same airplane.

Figure 7 is a longitudinal section view showing a pilot's dive brake control handle used to operate the mechanism shown in Figure 6.

Figure 8 is a perspective view showing the installation of a dive brake operated mechanism for actuating various control switches.

Figure 9 is a schematic electrical drawing diagrammatically showing the dive brake control circuit for operating the mechanism shown in Figure 6.

Figure 10 is a perspective view showing an alternate flap control and follow-up assembly.

Figure 11 is a perspective diagram showing an alternate dive brake control system for use with the flap mechanism in Figure 10.

Figure 13 is a schematic diagram showing an emergency flap power supply used with the control assembly in Figure 10.

Figure 1:
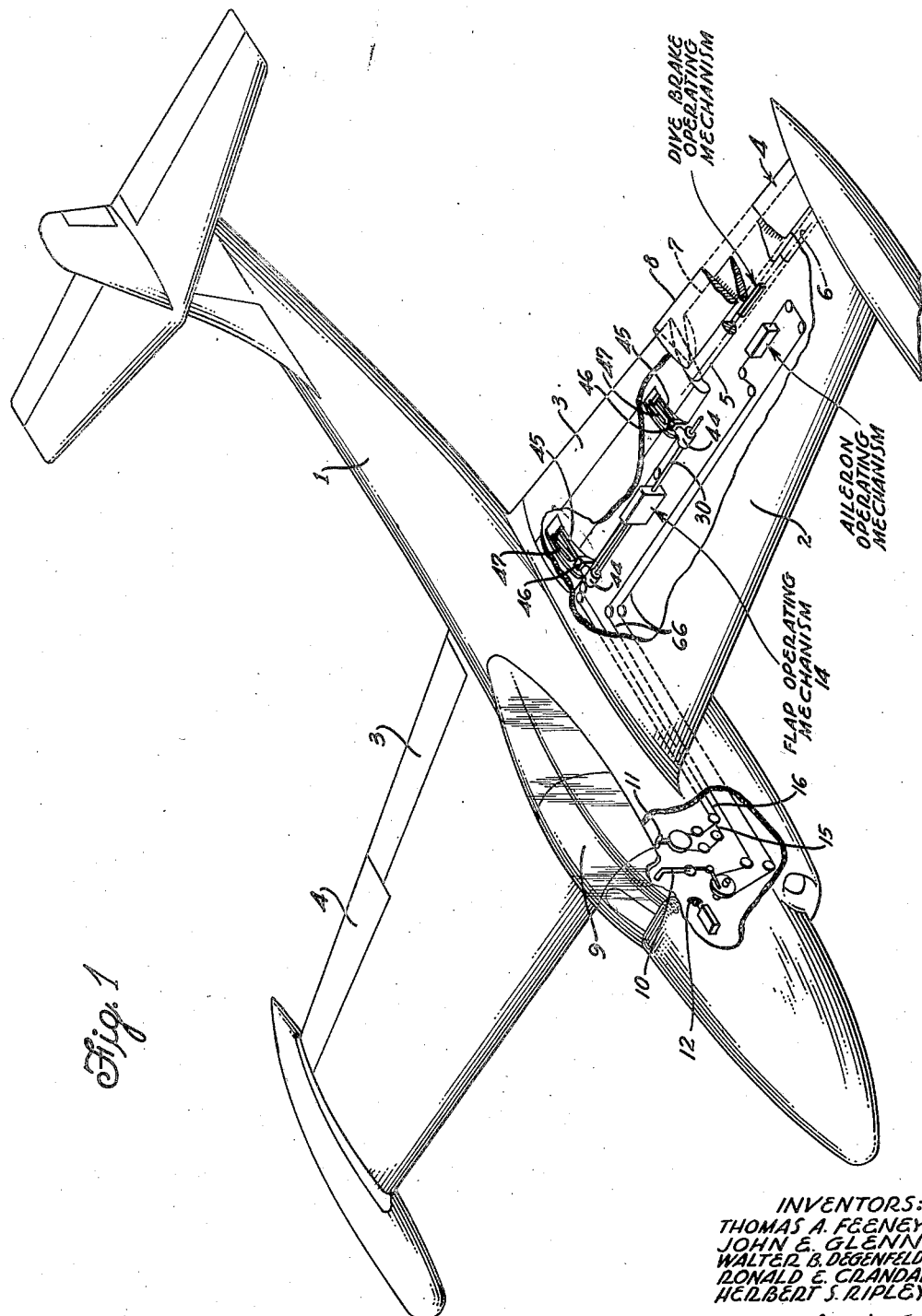
Figure 1 is a perspective view of an airplane showing landing flaps, ailerons, and dive brakes along the wing trailing edge connected by the control means of the present invention.

Referring first to Figure 1, an airplane 1 having a wing 2 is provided with extensible high-lift landing flaps 3 at the inboard trailing edge of the wing 2, and combination airfoils 4 at the outboard trailing edge of the wing adjacent to the flaps 3. The airfoils 4 each consists of a nose section 5 hinged to the wing structure at 6, and a pair of superposed surfaces referred to as dive brakes 7 and 8 hinged separately to the rear of the nose section 5. When the nose sections 5 are simultaneously deflected in opposite directions, the surfaces function as ailerons.

In the flight cockpit 9 of the airplane 1, a pilot's control stick 10 is connected for control of the ailerons, a landing flap handle 11 is connected for extension and retraction of the flaps 3, and a dive brake control handle 12 is connected for simultaneous splitting of the pair of dive brakes 7 and 8 on both sides of the airplane. The various interconnecting mechanisms will now be described.

A landing flap mechanism assembly 14, further shown in Figure 2, is installed in the wing 2 forward of the leading edge of the flaps 3. In this assembly, flap control cables 15 and 16 coming from the landing flap handle 11 are attached to opposite sides of an inner groove 17 of a flap control quadrant 19, so that fore-and-aft forces applied to the landing flap handle 11 will exert similarly related forces on the control quadrant 19. This quadrant is pin-connected at its lower end 20 to a flap control valve operating rod 21 and to a short link 22 which is rotatably mounted on a fixed support 24. The flap control quadrant 19 is also provided with an outer groove 25 in which two follow-up cables 26 and 27 are attached at opposite sides thereof. These cables lead to a follow-up mechanism 29 installed on a flap drive shaft 30. The mechanism comprises a threaded screw 31 machined on the drive shaft 30, this screw turning in a follow-up nut 32 which is prevented from turning by a stationary ridge 34 fitting into a guide groove 35 in the follow-up nut 32. Emergency stops (not shown) are preferably provided in the follow-up mechanism 29 to halt flap motion at each extreme end position in the event that the power is not properly shut off.

A flap control valve 36 actuated by the valve operating rod 21 is fixed to the aircraft structure 37 and contains pressure and return lines 39 and 40 connected to a hydraulic system (not shown) provided in the airplane, and flap up and down lines 41 leading to a hydraulic flap drive motor 42. This hydraulic motor is connected to rotate the flap drive shaft 30 which extends laterally across the airplane just forward of the landing flaps 3. As shown in Figure 1, a plurality of gear boxes 44 are connected by the drive shaft 30. A flap screw jack 45 extends rearwardly from each gear box 44, the screw jacks being connected in the gear box to be rotated by the drive shaft 30. The screw jacks 45 are threaded for the majority of their length and operate in nut units 46 pivotally attached to the flaps 3, so that the flaps are moved rearwardly and downwardly, rolling along flap tracks 47, when the drive motor 42 (Figure 2) is energized in the proper direction.

Thus, as the landing flaps 3 are raised or lowered by the drive shaft 30, the follow-up nut 32 will move axially on the threaded screw 31, and since the follow-up cables 26 and 27 are attached, one to each side of the follow-up nut 32, these cables can produce rotation of the flap control quadrant 19.

In operation from the "flaps up" position, when the flap control cable 16 pulls to the right on the control quadrant 19, as will be discussed later, the quadrant will be rotated a small amount about an axis located at the point of tangency of the follow-up cables 26 and 27, since at this time the flaps have not yet moved and the follow-up cables are stationary. Therefore, the valve operating rod 21 will be pulled out of the flap control valve 36 far enough to open it to produce flap movement in the down direction. The valve used in the present instance requires only 1/8 inch to open fully. Now the flaps are in motion and the direction of follow-up nut 32 motion is such that the follow-up cables 27 is pulling the control quadrant to the right also. Assuming the control cable motion is then stopped at some new position, the follow-up cables will rotate the flap control quadrant 19 about an axis located at the point of tangency of the control cables 15 and 16. This, of course, moves the valve operating rod 21 back into the valve 36 until the off position is reached, where the flaps and follow-up cables will be stopped.

The pilot's landing flap control handle 11, which actuates the flap control cables 15 and 16, is shown in Figures 3 and 4. The flap control handle 11, an outer drive lever 49, an inner drive lever 50, and a flap cable pulley 51 are rotatably and independently mounted side by side on a mounting bolt 52. A torsion spring 54 is also centrally positioned about the mounting bolt 52 between the inner drive lever 50 and the flap cable pulley 51. The inner end of this spring has a tang 55 which fits into an arbor slot 56 cut out of an arbor 57 constructed integrally with the inner drive lever 50 about its axis of rotation. The outer end of the torsion spring 54 has a partial loop 59 to which is attached a drive lever pin 60 fixed to the outer drive lever 49 near its outer end, after the spring has been preloaded by a predetermined amount of wind-up.

In the rest position of the flap controls, the outer ends of both drive levers 49 and 50 are held apart against the rotative force of the preloaded spring by a pulley arm pin 61 which is fixed to a cable pulley arm 62 attached to the flap cable pulley 51. Since both drive levers are bearing against this pulley arm pin 61, one on each side, no resultant force is exerted on the flap cable pulley 51 to rotate it about the mounting bolt 52. If, however, either the outer drive lever 49 or inner drive lever 50 is displaced in the direction away from the pulley arm pin 61, the torsion spring 54 is thus wound tighter, and the force of the other drive lever, which is acted on by the other end of the spring, exerted on the pulley arm pin 61 tends to rotate the flap cable pulley 51 in the same direction as the initial drive lever was displaced. Assuming the cable pulley 51 is free to turn, it will reach a new neutral position when the pulley arm pin 61 again contacts the end of the drive lever which was displaced.

A lower extension 64 of the landing flap handle 11 is provided with a control handle pin 65 which also fits between the drive lever ends, and is for the purpose of contacting and rotating one of the drive levers 49 or 50, depending upon which direction the flap handle 11 is moved. The flap cable pulley 51 is connected by the flap control cables 15 and 16 to the flap control quadrant 19 (Figure 2) as previously described, so that the position of the flap cable pulley 51 always corresponds to the instantaneous position of the landing flaps 3. In this manner, the flap cable pulley can indicate relative position of the flaps 3 by carrying a pointer moving over a graduated scale attached to the aircraft structure.

Thus, a non-rigid prepositioning system is provided, which permits rapid movement of the flap handle 11 to a desired position where the flaps 3 will follow until the pulley arm pin 61 reaches the new desired position where the torsional force on the flap cable pulley 51 is removed.

The aileron operating mechanism will be described next. As shown in Figure 1, a pair of aileron control cables 66 lead from the pilot's control stick 10 to a cable quadrant 67 (Figure 5) in the left-hand outer wing forward of the left-hand airfoil 4 to be operated. Additional aileron cables (not shown) operated by the control stick 10 lead to the right-hand wing for simultaneous operation of the right-hand airfoil by a system identical in operation to the left-hand aileron system to be described, but connected in reverse direction for conventional aileron control.

The cable quadrant 67 (Figure 5) is rotatably mounted on a fixed quadrant axis 69, and the cables 66 are connected in a cable groove 70 on each side of the quadrant 67 so that conventional movement of the control stick 10 will produce rotational motion of the cable quadrant 67 and a quadrant arm 71. Connected to quadrant arm 71 is a control rod 72 in turn connected to one end of a bell crank 74, the other end being rotatably mounted together with a piston rod terminal 75 on a fixed bell crank axis 76. A gimbal and bearing connection 77 near the outer end of the bell crank 74 carries a variable-length screw assembly 79 which connects at its inboard end to a valve shaft 80 of a servo control valve 81. The servo control valve 81 is contained in and fixed to the housing of a hydraulic aileron actuating cylinder 82 which carries an aileron piston rod 84 terminating at the bell crank axis 76 as mentioned before. This servo valve 81 is connected to the fluid pressure and return lines 39 and 40 from the airplane's hydraulic power supply, and controls the direction of fluid to the proper side of the enclosed actuating cylinder piston (not shown) to extend or retract the aileron piston rod 84 attached thereto relative to the aileron cylinder 82.

The closed, inboard end of the aileron actuating cylinder 82 is pin-connected to an operating linkage arrangement 85 which is connected directly to the airfoil nose section 5 to rotate the entire airfoil about the nose hinge line 6 when fluid pressure displaces the aileron actuating cylinder 82. A centering spring assembly 86 is pin-connected between the cable quadrant 67 and the aircraft structure 37. In the neutral position of the aileron controls, the centering spring center line is along a radius of the quadrant 67, so that movement of the controls to either side of neutral will introduce a "feel" to the system, tending to restore it to neutral.

The aileron control system is thus a typical full power system in which no surface loads whatsoever are felt or overcome by the pilot, since the servo valve 81 is the only part of the surface-moving equipment which is connected to the control stick, excluding the centering spring which gives a constant restoring force relation independent of surface loads.

In order to achieve better landing flap performance, a mechanism is provided which will automatically deflect both ailerons downwardly when the flap system hereinbefore described is operated to lower the landing flaps 3. This "aileron drooping" mechanism is also shown in Figure 5, where the variable length screw assembly 79 is attached at its end opposite the servo valve 81 to a telescoping square shaft assembly 87 so that rotation of the square shaft will turn one end of the screw assembly 79 in the gimbal connection 77 and thus move the valve shaft 80 to produce independent deflection of the airfoil nose section 5. This square shaft assembly 87 is connected to a shaft extension 89 of the flap drive shaft 30 so that lowering of the flaps 3 will cause simultaneous lowering of the aileron surface at both wing tips while still permitting normal roll control with the hydraulic full power aileron system. The aileron controls moved by the pilot are unaffected by this separate action since elongation or shortening of the variable length screw assembly 79 affects only the valve shafts 80; the bell cranks 74 remain stationary.

With the addition of the landing flap system extension to the aileron operating mechanism, the airfoil 4 has combined in it the function of an aileron and a landing flap. In the present apparatus, while the flaps 3 lower to a position about 50° down from normal, both airfoil nose sections 5 lower to a position about 28° down from neutral. The geometry of the systems can be designed to give various relations between flap movement and aileron movement, as desired.

The dive brakes 7 and 8, which are the top and bottom panels of the aileron, have been assumed completely closed together in the discussion thus far. Another power-operated system is provided to simultaneously rotate the top surface 8 of the dive brakes upwardly and the bottom surface 7 downwardly, and this system will now be described.

Figure 6 shows the dive brake mechanism, located in the nose section 5 of the airfoil 4, on the left-hand side of the airplane. A right-hand side mechanism operates in the same manner and both are controlled simultaneously. Installed in a lateral position near the center of the nose section 5 is a hydraulic dive brake actuating cylinder 90 having the customary piston (not shown) and a dive brake piston rod 91. Neither end of this cylinder nor the piston rod is fixed to the nose section structure, but one cylinder end 92 is pin-connected approximately at right angles to a support link 94 which can turn freely on a fixed pivot 95. To the same cylinder end 92 is connected an actuating tube 96 which operates two outboard bell cranks 97 and 98 pivoted in the outboard end of the nose section 5. The first bell crank 97 connects through a crank link 99 to the upper dive brake surface 8 below the hinge thereof and the second bell crank 98 connects through a similar crank link 99a to the lower dive brake surface 7 above the hinge thereof. Thus, a rearward push on both crank links 99 and 99a will rotate the upper surface 8 upwardly at the trailing edge and rotate the lower surface 7 downwardly at the trailing edge. In this manner, when the actuating tube 96 is forced toward the dive brake actuating cylinder 90 by hydraulic fluid pressure acting on the retraction side of the cylinder piston, the bell cranks 97 and 98 will rotate clockwise (from the top) and act simultaneously on the upper and lower dive brake surfaces to separate them.

Returning to the inboard end of the dive brake cylinder 90, the dive brake piston rod 91 is connected to two inboard bell cranks 100 and 101. These bell cranks are each linked to the respective dive brake surfaces similarly to the arrangement at the outboard end. The direction of operation is such that when the dive brake piston rod 91 is forced toward the dive brake actuating cylinder 90 by pressure acting on the retraction side of the cylinder piston, as above, the inboard bell cranks 100 and 101 will rotate counterclockwise (from the top) and act simultaneously on the upper and lower dive brake surfaces to separate them, in cooperation with the outboard bell cranks 97 and 98.

It will thus be seen that the floating dive brake actuating cylinder 90 forms a variable-length portion of an effective link between the inboard and outboard bell cranks, and that when this link is contracted or expanded, by cylinder pressure, the dive brakes 7 and 8 will be opened or closed respectively, rotating about their respective hinges. Since each dive brake surface has two operating links (inboard and outboard), which must move together at all times due to the same part they are mounted on, movement of the dive brake actuating cylinder 90 in one direction will always equal the movement of the dive brake piston rod 91 in the opposite direction during any opening or closing procedure.

The hydraulic dive brake actuating cylinder 90 is provided with a flexible "close" line 102 and a flexible "open" line 103 which alternately act as pressure and return lines for hydraulic fluid. These lines lead from a dive brake solenoid valve 104 mounted in the trailing edge structure of the wing 2. The solenoid valve 104 has two ports for the pressure supply line 39 and return line 40 which come from the airplane's hydraulic system, and two solenoids 105 and 106 (Figure 9) control its operation. Normally, when both solenoids are deenergized, the solenoid valve 104 is spring-controlled in the neutral position, closed to both cylinder "close" and "open" lines 102 and 103. When the valve "close" solenoid 106 is energized, the valve moves to supply pressure to the "close" cylinder line 102 and open the "open" cylinder line 103 to the return line 40. When the valve "open" solenoid 105 is energized, instead of the former, the solenoid valve 104 moves to supply pressure to the "open" cylinder line 103 and open the "close" cylinder line 102 to the return line 40. This solenoid valve 104 will not be described in detail since its construction and operation is well known to those skilled in the art.

Since the dive brake surfaces on the opposite sides of the airplane are operated by separate control valves, it would be possible for these surfaces to operate at slightly differing rates of motion and to assume different open positions if and when their motion were to be stopped before reaching the maximum open position. This would produce an undesirable turning of the airplane. Therefore, a synchronizer 107, Figure 9, is preferably employed to keep both sides in the same relative position when moving. The synchronizing system consists of a surface-operated potentiometer on each side of the airplane, the movable contacts of which are fixed to move with the surfaces and govern a bridge circuit which includes a polarized relay. By closing one of two contacts, depending on the direction of current flow if surface positions differ, the polarized relay will energize a power relay which will break the electrical circuit to the solenoid valve on the side of the airplane where the surfaces are moving faster. Thus, that valve momentarily returns to neutral until the slower side has caught up to where the polarized relay again opens. This synchronizing system will not be described in detail, since the operation of a polarized relay in a bridge circuit is well known.

For pilot operation of the dive brakes 7 and 8, the dive brake control handle 12, as shown in Figure 7, is a three-position push-pull handle containing two micro switches, one an "open" switch 109, and the other a "close" switch 110. When this control handle 12 is pulled, the "open" switch 109 only is actuated; when the handle is pushed, the "close" switch 110 only is actuated; and when the handle is released, a switch spring 11 returns the control handle 12 to neutral where both switches are open (non-actuated). These switches are effectively wired to the solenoids in the dive brake solenoid valves 104 to make the dive brakes 7 and 8 open or close under pilot control to any intermediate, or open or closed position.

As is now evident, the combination airfoils 4 can act as ailerons alone, with the dive brake surfaces 7 and 8 closed, or as ailerons and dive brakes at the same time, with the dive brake surfaces separated, since the dive brake operating cylinder mechanism is located in the nose of the aileron and is completely independent of aileron operation. The range of travel of either the ailerons or the dive brakes is not affected by the position of the other. In addition, the dive brakes 7 and 8 are interconnected with the landing flaps 3 to give dive brake surface separation automatically upon extension of the flaps, as follows.

Various electrical switches are provided between the dive brake control handle 12 and the dive brake solenoid valves 104, and their location and action will now be described. Mounted on the flap cable pulley 51 (Figures 3 and 4) is a beveled-end cam 112 which is arcuate in shape with its center of arc at the center of the pulley. A dive brake interconnecting switch 114 mounted on a switch bracket 115 secured to a fixed pulley guard 116 has an actuator roller 117 which rides on the cam 112 in any position of the flap cable pulley 51 except the extreme "flaps up" position, at which position the actuator roller 117 will run off the cam 112 at its beveled end 119 and return the interconnecting switch 114 to its normal, non-actuated position. This switch functions to operate the dive brakes in a certain manner yet to be described when the landing flaps are lowered any substantial amount from the neutral, or up, position.

Another switch, shown in Figure 2, is actuated by the landing flap mechanism assembly 14. Here, a switch actuator plate 120 is installed on the flap control quadrant 19 so that when the quadrant reaches the "flaps down" position, this actuator plate 120 operates a landing flap switch 121 which is firmly attached to the aircraft structure 37. Normally, this landing flap switch 121 is in the non-actuated position, but it is adjusted to be actuated when the landing flaps 3 reach a position 3° short of their full down position. This switch also functions to operate the dive brakes as will be described later.

The remaining two switches to be described are part of a mechanism located in the airfoil nose section 5. Figure 8 shows the installation of these micro switches and also one of the surface-operated potentiometers to control the synchronizer 107. Here the mechanism assembly consists of a fixed support plate 122 mounting a crank shaft assembly 124 in end bearings 125, and a potentiometer 126. A gear sector 127 turned by the crank shaft 124 meshes with a spur gear 129 fixed to the potentiometer shaft 130. An operating crank 131 attached to the crank shaft 124 connects by a crank rod 132 to the lower dive brake surface 7 above its hinge line. Thus, all movements of the dive brake surfaces in opening or closing will rotate the crankshaft 124 and thereby regulate the position of the potentiometer 126.

Also rigidly attached to the crankshaft 124 are two micro switch operating arms 134 and 135, the one nearer the potentiometer 126 being provided at its outer end with a hollow bar 136 into which an anchor nut has been pressed. An anti-creep actuator bolt 137 with a lock nut 138 is installed through this anchor nut, the entire arm arrangement being such that as the crankshaft 124 rotates, the head of the anti-creep actuator bolt 137 operates an anti-creep switch 139 placed with its actuating button 140 in line facing the bolt and crossing the projected center line of the crankshaft 124 at a right angle.

This anti-creep switch 139 is securely mounted in an angle bracket 141 attached to the support plate 122, and is so located that when the lower dive brake surface 7 is closed, the actuating button 140 is held inwardly by the anti-creep actuator bolt 137, closing the switch circuit. Proper adjustment of the anti-creep actuator bolt 137 is obtained so that when the lower dive brake surface 7 lowers 2° and 30 minutes (corresponding to a total dive brake separation of 5°), the anti-creep switch 139 will be opened. The function of this switch will be described later.

The other microswitch operating arm 135 is similar to the first except that its shut-off actuator bolt 142 points in the opposite direction from the anti-creep actuator bolt 137. The second switch, termed the shut-off switch 144, is securely mounted on the support plate 122, in position to be operated by the shut-off actuator bolt 142, but operates in reverse from the anti-creep switch 139, in that opening, instead of closing, of the dive brakes causes its actuation. The shut-off switch 144, like its actuator bolt 142, faces in opposite direction from the anti-creep switch components, and is so spaced and adjusted that when the lower dive brake surface 7 lowers 30° (giving 60° total dive brake separation), the shut-off actuator bolt 142 will contact a wheel 145 on a switch adapter 146 and actuate the shut-off switch 144. The shut-off switch, wired normally closed, is thus opened. The function of this switch will be given in a description of the electrical system operation to follow.

During dive brake movements exceeding 60° total separation, the shut-off actuator bolt 142 continues its movement of the shut-off switch adapter 146 which permits sufficient over travel to avoid damage to any parts. Since the foregoing dive brake switch mechanism is located in the airfoil nose section 5, its operation is not affected by aileron position. Also it will be noted that the action of the dive brake surfaces on both sides of the airplane can be controlled by these two switches located on one side only, since the synchronizer 107 keeps both pairs of surfaces at equal angles of separation at all times.

Referring to Figure 9 for normal dive brake operation, electrical power is supplied from a 28-volt D. C. positive bus 147 to the dive brake interconnecting switch 114. When the landing flap cable pulley 51 (Figure 3) is in the extreme "flaps up" position, or less than $\frac{1}{16}$ inch from this position, this interconnecting switch 114 is in the upper position as shown, so that power is available to the dive brake "open" switch 109 and the dive brake "close" switch 110 in the pilot's dive brake control handle 12. This handle is shown in the released position with neither of the foregoing switches actuated. There is a connection to the non-actuated side of the "open" switch 109 which will be described later and may be disregarded for the moment.

When the dive brake control handle 12 is pulled to actuate the "open" switch 109 against the switch spring 111 pressure, power is then suppplied through the synchronizer 107 to the "open" solenoids 105 and 105a in the dive brake solenoid valve 104 and 104a on each side of the airplane. The solenoids are connected to ground, or the negative side of the power supply; hence, the circuit is completed and the dive brake surfaces are opened to their maximum open position of 120°, at which position the dive brake actuating cylinder 90 has reached its limit of travel. When the dive brakes are full open (which takes approximately two seconds of time) and the control handle 12 is released, the "open" switch 109 returns to normal, thus returning the solenoid valves 104 and 104a to neutral to remove hydraulic operating pressure from the cylinder.

When the dive brake control handle 12 is then pushed to actuate the "close" switch 110, power is supplied through the synchronizer 107 to the "close" solenoids 106 and 106a which allow hydraulic fluid pressure to close the dive brake surfaces completely.

For normal landing flap operation, electrical power is supplied from the positive bus 147 to the interconnecting switch 114 as always. To lower the landing flaps all the way, the landing flap handle 11 is rotated completely aft, causing the landing flap system to be started, and closing the interconnecting switch 114 with its lower contact 149, as previously described. This supplies power to the landing flap switch 121 which is as yet non-actuated, and occupying the upper switch position as shown in the schematic electrical diagram.

In this position of the landing flap switch 121, power is supplied to the dive brake "close" solenoids 106 and 106a to close the dive brake surfaces, if open, or merely hold them closed otherwise. When the landing flaps reach a position 3° from full down, the landing flap switch 121 is actuated as explained previously, closing it with its lower contact 150.

From the landing flap switch lower contact 150 (Figure 9), power is now supplied through the shut-off switch 144, which is closed at present, to the dive brake "open" solenoids 105 and 105a, as controlled by the synchronizer 107. Thus, from the aileron drooped position, the dive brake surfaces 7 and 8 will open until the shut-off switch 144 is opened as previously explained, at 60° of dive brake angle, at which time they will stop since the shut-off switch 144 is in series with the landing flap switch 121.

It will be noted from the electrical diagram that if the pilot's dive brake control handle 12 is now operated, nothing will result, since power for the dive brake control switches 109 and 110 is stopped at the interconnecting switch 114. In fact, no dive brake action is obtained during any positions except full up or full down of the landing flaps. This prevents the dive brake surfaces from ever deflecting to an unreasonably large angle where they lose their desired effects.

When the pilot's landing flap handle 11 is then moved forward toward the "flaps up" position, and the landing flaps move up at least 3°, the landing flap switch 121 will then return to its normal, non-actuated position as shown in the diagram, again applying electrical power to the dive brake "close" solenoids 106 and 106a. This is true because the interconnecting switch 114 does not return to its normal position until the flap cable pulley 51 (Figure 3) is moved completely forward, as previously described, and the "close" circuit is now completed through the interconnecting switch 114, landing flap switch 121, synchronizer 107, "close" solenoids 106 and 106a, and ground and the dive brakes return to the closed position.

An additional feature is provided in addition to the basic system already described. It has been found that when the dive brake surfaces are closed and the solenoid valves are in neutral, the surfaces have a tendency to creep open, due to the reduced air pressure on the upper side of the wing. Therefore, a circuit is provided which will keep hydraulic fluid pressure in the "close" lines of the dive brake actuating cylinders when the dive brake control handle is in the neutral position. This circuit (Figure 9) consists of a wire 151 from the non-actuated side of the dive brake "open" switch 109 through the anti-creep switch 139 on the right-hand dive brake, to both "close" solenoids 106 and 106a. The right-hand "close" solenoid 106a is connected directly to the anti-creep switch 139 and the left-hand "close" solenoid 106 is connected to this switch through the synchronizer 107. In this manner, with all switches and levers in their normal positions, power is continuously supplied to both "close" solenoids to keep the dive brake surfaces completely closed, and avoid any drag caused by their separation.

If the dive brakes are open more than 5°, however, this additional circuit is broken by the anti-creep switch 139 as described before, since obviously it is not desirable to have the dive brakes return to the closed position after just opening them and letting the dive brake control handle return to the neutral position.

From the above description, it will be seen that as the landing flaps 3 are extended by the pilot, the combination airfoils 4 are being operated in a certain sequence. First, the ailerons are both drooped simultaneously as a function of flap movement. Then, after the flaps have reached the desired lowered position, the dive brake surfaces are automatically separated to give additional lift and thus increase the total flap effectiveness. Preferably, the upper dive brake surface finally assumes a position substantially in continuance with the upper surface of the wing. These various surface angles may be easily modified, however, to provide other positions as desired, and the invention is not limited to the particular arrangement of switches and timing features as herein disclosed.

Another embodiment of the landing flap mechanism assembly is shown in Figure 10, which is used in cooperation with a cable-controlled dive brake system shown in Figure 11, instead of the electrically controlled system described above. This second embodiment offers some advantages over the first, as will be apparent from the disclosure.

Referring to Figure 10, this alternate flap mechanism assembly 14a comprises a main casting vices. Shaft bearings 155 support the drive shaft segment 154, and associated follow-up devices. Shafte bearings 155 support the drive shaft segment 154, coupled to the flap drive shaft 30, and a parallel follow-up shaft 156 in the casting 152. The follow-up shaft 156 is driven from the drive shaft segment 154 by means of reduction gearing 157. The entire central section 159 of the follow-up shaft 156 is square, and on this square section rides a cable carriage 160, able to slide lengthwise relative to the follow-up shaft 156.

The cable carriage 160 has an axial sleeve 161, having a square bore and threaded on its exterior, and able to rotate relative to the remainder of the carriage when the sleeve is turned by the square section 159 of the follow-up shaft 156. A carriage nut 162 is screwed on the axial sleeve 161 and pivotally connected to a vertically extending actuator member 164 which prevents the carriage nut 162 from rotating in space. At the top of the actuator member 163, a self-aligning bearing 165 in the casting 152 allows this member 164 to pivot slightly when the carriage 160 is moved lengthwise on the follow-up shaft 156. Cable attachments 166 on the carriage 160 connect to the flap control cables 15 and 16 which come from the pilot's landing flap handle 11, so that displacement of this handle 11 tends to shift the cable carriage 160 along the follow-up shaft 156.

The flap control valve 36a, which can be identical with the flap control valve 36 of the previous apparatus, is bolted to the casting 152 with its valve stem 167 parallel to the follow-up shaft 156. A stem link 169 is pivotally connected between the valve stem 167 and the actuator member 164 so that the main axis of the stem link 169 is substantially perpendicular to the actuator member 164, thus allowing actuation of the valve upon movement of the cable carriage 160 while preventing binding of the stem in the valve.

The control valve 36a is connected by the usual hydraulic lines to control the hydraulic motor 42 attached to rotate the flap drive shaft 30 and drive shaft segment 154. Operation of this flap mechanism is then as follows: when the flap down cable 16 is pulled, for example, the cable carriage 160, including the carriage nut 162, will be pulled to the right, moving the actuator member 164 to the right, and pushing the valve stem 167 into the flap control valve 36a. Thus, the valve will be opened to cause rotation of the flap drive motor 42, which will turn the flap drive shaft 30 in the proper direction to lower the flaps 3. As the drive shaft rotates, the shaft segment 154 and the follow-up shaft 156 are also rotated, through the gearing 157, and the axial sleeve 161 is turned in the carriage nut 162, thus advancing the nut to the left relative to the carriage 160, which is in the direction tending to move the actuator member 164 back to neutral where the control valve 36a would be shut off. However, as long as cable tension is present due to the setting of the pilot's flap handle, the carriage will continue moving to the right, the valve being held open as a result of force from the torsion spring 54 at the pilot's handle. When tension is removed from the flap cables, the carriage 160 will stop but the follow-up shaft 156 and axial sleeve 161 will continue rotating momentarily until the carriage nut 162 places the actuator member 164 and flap control valve 36a in neutral. The flaps and follow-up shaft 156 will then stop and remain in that position until the flap control handle 11 is again actuated.

The flap drive shaft 30 extends in the outboard direction past the landing flaps 3, as in the previous embodiment, where the flap extension 89 (Figure 5) droops the ailerons simultaneously, as before.

Before the remainder of the alternate flap mechanism assembly 14a is explained, the modified dive brake control system, noted previously, will be described. As shown in Figure 11, the dive brake surfaces 7 and 8, actuating cylinder 90, and connections therebetween operate exactly as discussed previously. Instead of the solenoid valve 104, however, a manually-operated four-way hydraulic valve 170 is provided, this valve being installed in the wing trailing edge structure and connected by the flexible "open" and "close" lines 102 and 103 to the dive brake actuating cylinder 90 within the airfoil nose section 5. This four-way valve is also supplied by the pressure and return lines 39 and 40 from the airplane's hydraulic system.

A valve operating spool 171 extends from the four-way valve 170 and is pin-connected by a fork 172 to one end of a valve control lever 174. The center of the valve control lever 174 is rotatably connected to a lever pivot 175 and the other end is connected by a push-pull rod 176 to a dive brake control quadrant 177 pivoted to the wing structure.

A dive brake "open" cable 179 and a dive brake "close" cable 180 are attached to the ends of grooves in opposite sides of the dive brake control quadrant 177, so that movement in the respective cables will produce rotation of the quadrant. This rotation will be transmitted to the valve control lever 174 which will rotate about the lever pivot 175 and move the valve spool 171 into or out of the four-way valve 170 to control the dive brake surfaces. The dive brake "open" and "close" cables 179 and 180 lead inboard to attach to interconnecting pulleys 181 to which is also attached a handle cable 182 leading over idler pulleys 184 to a pilot's dive brake lever 185. Control of the dive brake operating mechanism is thus provided for the pilot. Additional dive brake "open" and "close" cables 179a and 180a extend beyond the interconnecting pulleys 181 to operate the identical dive brake installation on the opposite side of the airplane. By this means, the dive brake surfaces 7 and 8 on both sides of the airplane are thus interconnected by positive cable action so that their positions are synchronized at all times. The dive brake "open" and "close" cables also pass through the landing flap mechanism 14a, as will be described later.

A follow-up horn 186 attached to one of the dive brake surfaces is linked to a driver sheave 187 so that movement of the surface rotates the driver sheave about an axis in the nose section 5. Dive brake follow-up cables 189 wrap around the driver sheave 187, pass over follow-up pulleys 190, and wrap around a driven sheave 191 attached to an axle 192 rotatably mounted in a bearing block 194 fixed to the airplane structure in the wing 2. Between the sets of follow-up pulleys 190, the dive brake follow-up cables 189 coincide with the aileron hinge line 6, which is the hinge line of the nose section 5, so that the ailerons can be in any position without affecting the action of the dive brake follow-up cables 189 which cross from the wing structure to the dive brake surfaces. When the ailerons deflect, these follow-up cables 189 are merely twisted along the portions which lie on the aileron hinge line 6.

The axle 192, after passing through the bearing block 194, carries a pivot leg 195 solidly attached to the axle 192 and extending at a right angle thereto. This pivot leg 195 is parallel to the valve control lever 174, and the outer end of the pivot leg is rotatably connected to the lever pivot 175. Thus it is seen that as the dive brake surfaces are opened or closed, the follow-up cables 189 will rotate the driven sheave 191 and axle 192, and deflect the pivot leg 195 through an angle proportional to dive brake movement.

The direction of travel of the follow-up cables 189, after actuation of the dive brakes by the pilot's lever as described, is such as to cause the pivot leg 195 to rotate the valve control lever 174 about its connection with the push-pull rod 176 to move the valve spool 171 toward its neutral position in the four-way valve 170. Therefore, for every position of the pilot's dive brake lever 12, there is a corresponding dive brake position at which the valve will be in neutral, due to the servo action of the control and follow-up mechanisms at the valve control lever 174. This dive brake control system is a full power system similar to the aileron control system, in which no forces from the surfaces are transmitted back to the pilot or to the control valve.

This dive brake system is preferably designed and rigged so that the dive brake actuating cylinder piston is bottomed against the cylinder 90 at each end of its travel, thus forming stops defining the maximum range of movement. Hydraulic pressure is therefore present in the actuating cylinder 90 at both the open and closed positions to positively keep the surfaces in place.

The dive brake actuating cylinder 90, described as in Figure 6, may be modified so as to have a stationary cylinder fixed to the nose section structure and having two enclosed pistons, each piston operating a rod or actuating tube projecting from opposite ends of the cylinder to connect to the inboard and outboard bell cranks respectively. Operation would be the same as before, with pressure being applied between the opposed pistons for closing the dive brakes, and applied at each end of the cylinder back of each piston for opening the dive brakes.

With reference to Figure 10 again, the dive brake "open" cable 179a and the dive brake "close" cable 180a pass through the ends of the casting 152 and through individual guide tubes 196 mounted parallel to the drive shaft segment 154 within the flap mechanism. An upper sliding tube 197 fits over one of the guide tubes and a lower sliding tube 198 over the other guide tube. These sliding tubes 197 and 198, as the names imply, are able to slide longitudinally along their respective guide tubes 196. The sliding tubes 197 and 198 project through holes in the left end of the casting 152 and are each provided at the left end with an end plug 199, containing a central cable hole, held in the tube by retainer pins 200 and safety wire 201 wrapped through the ears of the retainer pins 200 and around the sliding tube. The sliding tubes 197 and 198 are prevented from backing through the left end of the casting 152 by the retainer pins 200. The right end of each sliding tube carries a raised bead 202 which retains the tubes in the 152 casting.

Each dive brake cable 179a and 180a is provided with a swaged fitting 204 and 205 respectively, the fittings located outside the casting 152 beyond the left end. The swaged fittings 204 and 205 butt up against the end plugs 199 of the sliding tubes 197 and 198, although not simultaneously, at certain positions of the cables and tubes.

The drive shaft segment 154, rotating in the casting 152, is threaded on its exterior to receive a segment nut 206. This nut travels along the threaded segment 154 as the landing flaps are extended or retracted, thus providing a measure of flap position at all times. The segment nut 206 has a side piece 207 projecting toward the guide tubes 196 and having two clearance holes which fit around each guide tube. This prevents the segment nut 206 from turning relative to the casting as the drive shaft segment 154 revolves, and furnishes a driving means for the sliding tubes 197 and 198. The side piece 207, as the segment nut 206 travels to the left over the drive shaft segment 154, will contact the right ends of the sliding tubes 197 and 198, moving them to the left through the casting end, along the dive brake cables.

The landing flaps 3 are in the "up" or retracted position when the segment nut 206 is at the extreme right end of the drive shaft segment 154, and the dive brake surfaces 7 and 8 are completely closed when the dive brake "close" cable 180a is moved to its extreme right-hand position where the "close" cable fitting 205 is practically adjacent to the casting 152, both these conditions being shown in Figure 10. The upper sliding tube 197 in this embodiment is somewhat longer than the lower sliding tube 198. From this position of both the landing flaps and dive brakes, it can be seen that when the landing flaps are lowered as described previously, the segment nut 206 will travel to the left, first contacting the right end of the upper sliding tube 197, and sliding it also to the left. The dive brake cables 179a and 180a will remain stationary during this time, since the "open" cable fitting 204 is positioned farther out to the left. As the flaps continue lowering, the side piece 207 will contact the right end of the lower sliding tube 198, which is resting with its end plug 199 against the "close" cable fitting 205, and slide it to the left also. This action will now drive the dive brake "close" cable 180a to the left and the dive brake "open" cable 179a will progress to the right, since it is a closed cable system, thus actuating the entire dive brake control system to open the dive brake surfaces 7 and 8 as previously described. The system relations are so designed that when the flaps are completely lowered, the dive brakes are open a total of 24°.

Other operating characteristics of this interaction between the flaps and dive brakes are now evident. If the dive brakes are open at the time the flaps start lowering, the "open" cable fitting 204 will be in the right-hand position nearest the casting 152, and the segment nut side piece 207, upon first contacting the upper sliding tube 197, will drive the dive brake "open" cable 179a to the left, thus moving the dive brakes toward the closed position. They will, of course, not be completely closed by this action; in fact, they may be left open a total of 60°, for example, after the flaps are completely lowered in this instance. Therefore, with the flaps lowered, the pilot can still operate the dive brake system manually between 24° and 60°. No position outside this range is possible with the flaps down, since one of the cable fittings 204 or 205 will butt against its respective sliding tube at 24° and at 60° of dive brake separation. When the flaps are up, however, positioning the segment nut 206 at the right end of the casting 152, the dive brakes have their full range of 0° to 120°.

With a flap and dive brake interconnecting system as disclosed in Figures 10 and 11, the beveled-end cam 112 and dive brake inter-connecting switch 114 previously described as being located at the landing flap handle 11 (Figures 3 and 4) are no longer necessary and would be omitted altogether. Otherwise, the function of this flap handle assembly remains the same for both flap apparatus.

During operation of the landing flaps 3, the aileron combining mechanism is functioning as herein described, together with the separation of the dive brake surfaces 7 and 8 as controlled by this flap mechanism assembly 14a, so that, with operation of the landing flap system, the combination airfoils 4 are simultaneously deflected downwardly in proportion to flap downward travel and then the dive brakes are automatically controlled to be between 24° and 60° open, as described above, when the flaps are full down (about 50°) and the ailerons are fully drooped (about 28°). It is important to note that at all positions of the airfoils 4 whatsoever, normal aileron action can modify the basic deflection by the full range of aileron control (approximately 13° up and 13° down) in either direction from the instantaneous neutral.

Figure 12:
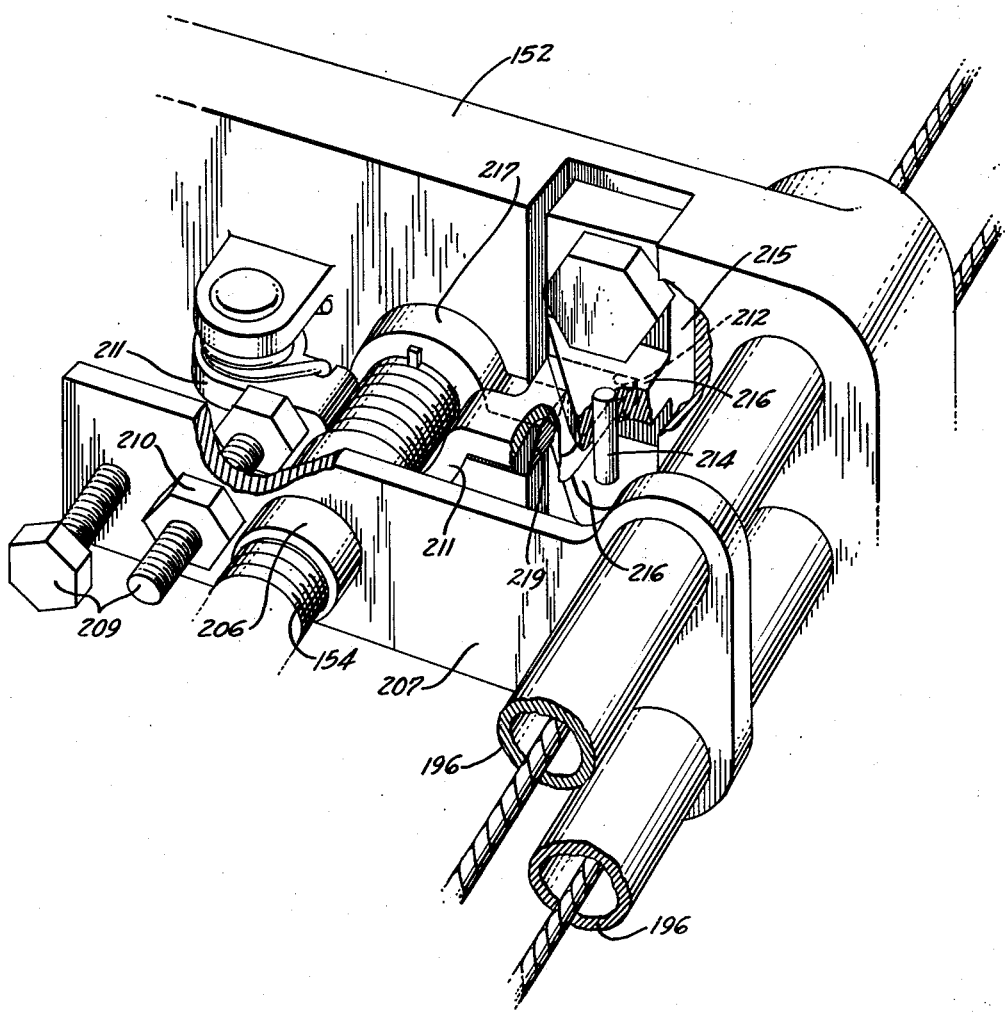
Figure 12 is a perspective detail view showing the emergency stop device of the flap control assembly in Figure 10.

The emergency flap system stops are also shown partially in Figure 10 and fully in Figure 12. On the opposite side of the segment nut 206 from the side piece 207 are installed two adjustable stop screws 209 with lock nuts 210, these screws being threaded through the material extended from the segment nut 206. At the extreme ends of travel of the segment nut 206, beyond the normal stopping position of the system, one of the stop screws 209 will contact a stop 211 pivotally mounted to rotate in a horizontal plane. The stop 211 is spring-loaded toward the center of the drive shaft segment 154 and normally rests with a tip 212 of its outer end bearing against a stop pin 214 in a rigidly mounted guard 215. As shown on a larger scale in Figure 12, the guard 215 includes two side plates 216 which are spaced by a distance equal or just larger than the width of the stop 211 and which flank the stop at the top and bottom. Thus the stop 211 is constrained from vertical movement even when under a relatively large force.

When the stop is rotated against its spring force, it approaches a pawl 217 keyed to the drive shaft segment 154 at each end just within the casting walls. As the drive shaft segment is rotating and the segment nut 206 reaches the stop 211, the stop screw 209 will contact the stop 211 close to its pivoted end and swing the outer end into interference with a lug 219 projecting from one side of the pawl 217, which is rotating with the shaft. An inertia type stop is thereby provided, since the pawl will be positively stopped by the stop 211 which is in turn prevented from giving because of the side plates 216 of the guard 215. This engaged position is illustrated in Figure 12.

The adjustment of the stop screw 209 and the rigging of the various parts of the stopping apparatus provide that one revolution of the drive shaft segment 154 in the opposite or freeing direction will give the outer end of the stop 211 time to withdraw, under its spring force, so it will not be contacted by the back edge of the lug 219 when traveling away from the stopped position. In other words, one revolution is sufficient either to actuate the stop completely or render it completely inactive. No binding of parts, such as jamming the threads of the segmenet nut, results from the action of this stop, and fluid pressure in the reverse direction will immediately and easily produce motion of the flaps away from their extreme end position. The normal maximum range of the flap controls, however, does not bring this stop device into play, it being solely an emergency device.

In the event of failure of the normal landing flap power supply or loss of hydraulic fluid from the lines, it is still possible to actuate the flaps by means of an electrically energized emergency power source controlled by the normal flap operating mechanism. In Figure 10, a pair of emergency flap actuating switches 220 are adjustably fixed to the casting 152, one switch on each side of the valve actuator member 164. As the actuator member is deflected to operate the flap control valve 36a, it will contact and close one of the emergency switches 220 in addition to operating the valve. Normally, these switches are ineffective since the electrical circuit in which they are connected remains open until a manually operated switch is closed to make the emergency system action available.

Figure 13 diagrammatically shows the units and connections of the emergency flap system. Here, the emergency switches 220 are wired in parallel with each other and in series with a pilot-operated master switch 221 located convenient to the pilot of the airplane. The master switch 221 is wired to one side of an electric power source 222, the other side of which may be grounded. The other side of the emergency switch combination is connected to operate an electric motor 224 driving a fluid pump 225 in a supply pipe 226 from a reservoir 227. A return pipe 229 drains into the reservoir 227 and a pressure relief valve 230 connects a pump outlet line 231 to the return pipe 229.

The pump outlet line 231 is provided with a check valve 232 between the relief valve 230 and the main hydraulic pressure line 39 which supplies the flap control valve 36a. In the normal pressure supply line 39, before its juncture with the pump outlet line 231, is installed a second check valve 232a. The main return line 40 serving the flap control valve 36a carries a solenoid-operated shuttle valve 234 to which is also connected the return pipe 229. This shuttle valve 234 is wired to be energized whenever the electric motor 224 is operated, by the closing of either one of the emergency switches 220, in addition to the master switch 221. When the shuttle valve 234 is deenergized, the normal return line 40 is open to the fluid return connection from the control valve 36a while the return pipe 229 is closed. When the shuttle valve 234 is energized, the normal return line 40 closes while the fluid return from the control valve 36a opens to the return pipe 229.

Considering that the master switch 221 is closed, the emergency flap system will automatically operate whenever the valve actuator member 164 (Figure 10) is displaced in the usual manner by the pilot. Besides moving the valve stem 167 in the proper direction, one of the emergency switches 220 will be closed, which, through the fluid pump 225, causes hydraulic fluid 235 from the reservoir 227 to be pumped through the check valve 232 and into the pressure port of the control valve. Return fluid from the control valve passes through the return pipe 229 back to the reservoir.

The check valves 232 and 232a prevent fluid from running from one system to the other, and thus the entire supply of fluid from both systems is not lost in case of a leak. The shuttle valve 234, by closing off the fluid return connection to the system not being used at any one time, also prevents loss of fluid through the inoperative system.

It is thus seen that the invention disclosed herein enables and causes operation of a number of control surfaces through a number of interrelated power means. The various power means are also controlled and operated separately by conventional piloting controls to perform the normal movement of attitude control surfaces in flying the airplane. Specifically, the present invention increases high-lift landing flap area in a relatively small, high speed airplane, by providing full-span action. However, it is evident that the principles taught by these devices may be applied to other combinations besides those involving high-lift flaps as the primary controlling factor. Since full-power control systems are used throughout, the pilot is not called upon to resist any of the surface loads resulting from the variations of surface deflection.

While the apparatus of the present invention is shown as applied to a conventional type airplane with tail surfaces, it may easily be seen that the same method also applies to an all-wing type airplane. In fact, for the latter type airplane, by providing separate controls for the dive brake mechanisms on each side of the airplane, drag rudders are obtained; and by handling the aileron mechanisms similarly, elevons for both elevation and roll control are obtained. Thus, all of the above mentioned functions can be combined into a single portion of the wind area, for which the term "deceleron" has been coined.

Further, because of the 100% use of full-power control systems, any type of synthetic "feel" may be introduced into the pilot's control members; therefore, the aileron centering spring assembly mentioned herein, is not necessary to practice this invention.

The flap control system described herein is particularly advantageous because of its compactness and simplicity of design and serviceability. It occupies a minimum of space, and possesses the desirable property of allowing the pilot to set his flap handle to any desired position in one quick movement, while the flap surfaces follow at their normal, slower, rate until the new indicated position is reached, where the actuating system will shut off.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is, therefore, claimed in any of its forms or modifications within the legitimate and valid scope of the appended claims.

What is claimed is:

1. In an airplane having a wing with a high-lift flap thereon, a reversible hydraulic motor connected to extend said flap when energized in one of two directions and to retract said flap when energized in the other of said directions, a four-way hydraulic control valve connected to energize said hydraulic motor in either of said directions and to deenergize said motor from a hydraulic power source, a valve stem for manually operating said control valve, an elastic element having its opposite ends adjacent and tending to move toward each other, a restraining element between said ends to hold said ends apart, a linkage connecting said valve stem to said restraining element, a hand-operated lever, and an extension on said lever also placed between said elastic element ends, both of said ends contacting said restraining element and said lever extension simultaneously to determine a neutral position where no forces are transmitted by said elastic element to said linkage or said lever, whereby a force in either direction can be applied by said lever to said valve stem through said elastic element, and flap follow-up means connected between said flap and said linkage to deenergize said hydraulic motor when said flap moves to a position corresponding to any particular setting of said lever.

2. Apparatus in accordance with claim 1 wherein said flap follow-up means comprises a threaded shaft connected to rotate in proportion to flap travel, a follow-up nut travelling axially on said shaft, and positive driving means connected between said follow-up nut and said valve stem in cooperation with said linkage and in the proper direction to return said valve stem to the deenergizing position of said valve in response to flap travel initiated by operation of said lever.

3. In an airplane having a movable control surface, a pilot's surface control unit comprising a mounting axle, a handle, two spring support levers, and a control quadrant, all rotatably mounted on said axle, a spiral torsion spring centered at said axle and having opposite ends connected respectively to said support levers, said spring being preloaded a predetermined amount, a handle pin attached to said handle and inserted between said support levers to hold said levers from allowing said torsion spring to unwind, a quadrant pin attached to said control quadrant and also inserted between said support levers, both of said pins simultaneously contacting both of said levers in a neutral position of said control unit where no forces exist tending to move either said handle or said control quadrant, said control quadrant being adapted to be operatively connected for movement of said surface.

4. In an airplane having a wing with a high-lift flap thereon, flap power means connected to extend said flap when energized in one of two directions and to retract said flap when energized in the other of said directions, flap control means connected to energize said flap power means in either of said directions, flap follow-up means connected to said flap and to said flap control means to deenergize said flap power means when said flap moves to a position corresponding to any particular setting of said flap control means, said flap control means including a hand-operated lever and an elastic element connected between said lever and said flap power means, said elastic element having a neutral position where said flap power means is deenergized, and having deflected positions on each side of said neutral position to allow rapid prepositioning of said lever to any desired setting to move said flap to said corresponding position at its normal rate of travel, a pair of superposed dive brake surfaces on the trailing edge of each side of said wing, each surface being separately pivoted along its leading edge, separate dive brake power means for each of said pairs of surfaces, each of said dive brake power means being connected to rotate its respective pair of surfaces in opposite directions simultaneously for separation of said surfaces, dive brake control means connected to both of said dive brake power means to separate both of said pairs of surfaces simultaneously, and means connecting said flap follow-up means to said dive brake control means to regulate the relative positions of said dive brake surfaces in accordance with the position of said flap.

5. In an airplane having a wing with a high-lift flap thereon, flap power means connected to extend said flap when energized in one of two directions and to retract said flap when energized in the other of said directions, flap control means connected to energize said flap power means in either of said directions, flap follow-up means connected to said flap and to said flap control means to deenergize said flap power means when said flap moves to a position corresponding to any particular setting of said flap control means, said flap control means including a hand-operated lever and an elastic element connected between said lever and said flap power means, said elastic element having a neutral position where said flap power means is deenergized, and having deflected positions on each side of said neutral position to allow rapid prepositioning of said lever to any desired setting to move said flap to said corresponding position at its normal rate of travel, an aileron pivotally mounted on an aileron hinge near each end of said wing along the trailing edge thereof, said aileron comprising a nose section along the leading edge thereof and a pair of superposed surfaces each hinged to the rear of said nose section on dive brake hinges parallel to said aileron hinge, separate aileron power means located in said wing connected to each aileron to deflect said aileron upwardly and downwardly about said aileron hinge from a neutral position, aileron control means connected to both of said aileron power means to move said ailerons in opposite directions simultaneously, means connecting said flap power means to each of said aileron power means to deflect said ailerons in the same direction simultaneously when said flap power means is energized, whereby said ailerons are deflected downwardly as said flap is being extended.

separate dive brake power means located in each of said nose sections connected to rotate their respective pair of dive brake surfaces in opposite directions simultaneously about said dive brake hinges for separation of said surfaces, dive brake control means connected to both of said dive brake power means to separate both of said pairs of surfaces simultaneously, and means connecting said flap follow-up means to said dive brake control means to regulate the relative positions of said dive brake surfaces in accordance with the position of said flap.

6. Apparatus in accordance with claim 1 wherein said linkage comprises an operating rod pin-connected in line with said valve stem, a control lever pivotally connected to said operating rod substantially at a right angle thereto and in a common plane of motion therewith, and a control attachment pivot on said control lever, said control attachment pivot having a two-way positive driven relationship with said restraining element, and wherein said flap follow-up means comprises a threaded shaft connected to rotate in proportion to flap travel, a follow-up nut travelling axially on said shaft, and a follow-up attachment pivot on said control lever, said follow-up attachment pivot having a two-way positive driven relationship with said follow-up nut.

7. Apparatus in accordance with claim 1 wherein said linkage comprises an operating rod pin-connected in line with said valve stem, an actuator member pivotally connected to said operating arm substantially at a right angle thereto and in a common plane of motion therewith, said actuator member being connected to a fixed pivot, a carriage assembly pivotally connected to said actuator member, means defining a square passage extending through said carriage, a mating square shaft fitting inside said square passage with said carriage slidable along said square shaft, and means for sliding said carriage in either direction along said square shaft in accordance with the position of said restraining element, and wherein said flap follow-up means comprises means for rotating said square shaft in proportion to flap travel, an exteriorly threaded portion on said carriage assembly adapted to rotate relative to said sliding means and built integrally with said passage defining means, and an interiorly threaded portion of said carriage mounted to travel axially along said exteriorly threaded portion, said interiorly threaded portion being provided with the means for pivotally connecting said carriage assembly to said actuator member as hereinbefore recited.

8. In an airplane having a wing with a high-lift flap thereon, flap power means connected to extend said flap when energized in one of two directions and to retract said flap when energized in the other of said directions, flap control means connected to energize said flap power means in either of said directions, flap follow-up means connected to said flap and to said flap control means to deenergize said flap power means when said flap moves to a position corresponding to any particular setting of said flap control means, said flap control means including a hand-operated lever and an elastic element connected between said lever and said flap power means, said elastic element having a neutral position where said flap power means is deenergized, and having deflected positions on each side of said neutral position to allow rapid prepositioning of said lever to any desired setting to move said flap to said corresponding position at its normal rate of travel, a pair of superposed dive brake surfaces on the trailing edge of each side of said wing, each surface being separately pivoted along its leading edge, electrically controlled dive brake power means connected to rotate each of said pairs of surfaces in opposite directions simultaneously for separation of said surfaces, electrical switching means connected to energize said dive brake power means in either of two directions, said switching means being mechanically connected to be operated by said flap follow-up means to energize both of said dive brake power means in the "open" direction upon the approximate reaching of the extended position of said flap and to energize both of said dive brake power means in the "close" direction upon the approximate leaving of said extended position of said flap.

9. In an airplane having a wing with a high-lift flap thereon, flap power means connected to extend said flap when energized in one of two directions and to retract said flap when energized in the other of said directions, flap control means connected to energize said flap power means in either of said directions, flap follow-up means connected to said flap and to said flap control means to deenergize said flap power means when said flap moves to a position corresponding to any particular setting of said flap control means, said flap control means including a hand-operated lever and an elastic element connected between said lever and said flap power means, said elastic element having a neutral position where said flap power means is deenergized, and having deflected positions on each side of said neutral position to allow rapid prepositioning of said lever to any desired setting to move said flap to said corresponding position at its normal rate of travel, a pair of superposed dive brake surfaces on the trailing edge of each side of said wing, each surface being separately pivoted along its leading edge, electrically controlled hydraulic dive brake power means connected to rotate each of said pairs of surfaces in opposite directions simultaneously for separation of said surfaces, electrical control switching means connected to energize said dive brake power means in either of two directions, said control switching means being mechanically connected to be operated by said flap follow-up means to energize both said dive brake power means in the "open" direction upon the approximate reaching of the extended position of said flap and to energize both said dive brake power means in the "close" direction upon the approximate leaving of said extended position of said flap, manual dive brake control means also electrically connected to energize both said dive brake power means in either said "open" or "close" direction, and follow-up switching means electrically connected to select energization control of both said dive brake power means either by said control switching means alone or by said manual dive brake control means alone, said follow-up switching means being mechanically connected to said flap follow-up means to select said control switching means as the operative path when said flap is moved by said flap control means to any position except the fully retracted position and to select said manual dive brake control means as the operative path when said flap is positioned in said retracted position by said flap control means, whereby manual separation control of said dive brake surfaces is provided at all times when said flap is in said retracted position, and automatic separation control of said dive brake surfaces as set forth above is provided at all times when said flap is in any position except said retracted position.

10. In an airplane having a wing with a high-lift flap thereon, flap power means connected to extend said flap when energized in one of two directions and to retract said flap when energized in the other of said directions, flap control means connected to energize said flap power means in either of said directions, flap follow-up means connected to said flap and to said flap control means to deenergize said flap power means when said flap moves to a position corresponding to any particular setting of said flap control means, said flap control means including a hand-operated lever and an elastic element connected between said lever and said flap power means, said elastic element having a neutral position where said flap power means is deenergized, and having deflected positions on each side of said neutral position to allow rapid prepositioning of said lever to any desired setting to move said flap to said corresponding position at its normal rate of travel, a pair of superposed dive brake surfaces on the trailing edge of each side of said wing, each surface being separately pivoted along its leading edge, cable controlled dive brake power means connected to rotate each of said pairs of surfaces in opposite directions simultaneously for separation of said surfaces, control cables connected to energize both said dive brake power means simultaneously in either of two directions to open and close said dive brake surfaces, manual control means directly connected to said control cables to normally operate said cables through a range between the full open and closed positions of said dive brake surfaces, and cable drive means connected between said flap follow-up means and said control cables to position said control cables in accordance with the position of said flap follow-up means when said flap is extended, whereby said manual control means can be overridden by said flap follow-up means to provide a manually controlled dive brake surface range of travel which is substantially narrower than said normal when said flap is in said extended position.

11. In an airplane having a wing with a high-lift flap thereon, flap power means connected to extend said flap when energized in one of two directions and to retract said flap when energized in the other of said directions, flap control means connected to energize said flap power means in either of said directions, flap follow-up means connected to said flap and to said flap control means to deenergize said flap power means when said flap moves to a position corresponding to any particular setting of said flap control means, said flap control means including a hand-operated lever and an elastic element connected between said lever and said flap power means, said elastic element having a neutral position where said flap power means is deenergized, and having deflected positions on each side of said neutral position to allow rapid prepositioning of said lever to any desired setting to move said flap to said corresponding position at its normal rate of travel, a pair of superposed dive brake surfaces on the trailing edge of each side of said wing, each surface being separately pivoted along its leading edge, cable controlled hydraulic dive brake power means connected to rotate each of said pairs of surfaces in opposite directions simultaneously for separation of said surfaces, control cables connected to energize both said dive brake power means simultaneously in either of two directions to open and close said dive brake surfaces, manual control means directly connected to said control cables to normally operate said cables through a range between the full open and closed positions of said dive brake surfaces, wherein said flap follow-up means includes a threaded shaft connected to rotate in proportion to flap travel, a nut member travelling axially on said shaft and positioned near one end of said shaft when said flap is retracted, a side piece extending outwardly from said nut member, said side piece having two cable-actuating portions at the outer end thereof, said control cables including a dive brake "open" cable and a dive brake "close" cable, each cable extending respectively adjacent to one of said cable-actuating portions and parallel to said threaded shaft, and moving in opposite directions respectively from each other as said dive brakes are operated, and means attached to each of said "open" and "close" cables and positioned toward the other end of said threaded shaft from said side piece, said latter means each being located at a predetermined position and adapted to be individually contacted to the exclusion of the other and pushed by movement of said side piece when said flap is extended, whichever cable is thus actuated depending upon the position of said dive brake surfaces, whereby said dive brake surfaces will be automatically closed a predetermined amount if in the full open position when said flap is extended and whereby said dive brake surfaces will be automatically opened a predetermined amount if in the full closed position when said flap is extended.

12. An aircraft control system comprising a control surface to be moved, surface power means connected to move said surface in either of two directions when energized, surface control means connected to energize said power means in either of said directions, surface follow-up means connected to said surface and to said control means to deenergize said power means when said surface moves to a position corresponding to any particular setting of said control means, and emergency stop means operable beyond the normal maximum travel range of said surface at each end thereof to positively block further motion of said surface in the direction tending to exceed its end limits, said emergency stop means comprising a threaded shaft connected to rotate in proportion to surface travel, a nut member travelling axially on said shaft, adjustable stop actuator means on said nut member, a stop element pivotally attached near each end of said shaft to move in a plane parallel to the axis of said shaft and elastically urged to a disengaged position, and a pawl element securely attached at each end of said shaft to rotate with said shaft, said pawls each having a substantially flat projection extending outwardly therefrom, said stop actuator means being arranged and adapted to contact and move said stop against its elastic urge into interference with said projection as said nut member reaches each extreme end position on said shaft, whereby said shaft is mechanically blocked and prevented from further rotation in the same direction.

13. An aircraft control system comprising a control surface to be moved, power-operated means connected to move said surface in either of two directions when energized, control means connected to energize said power-operated means in either of said directions from a supply of power, a manual linkage connected to operate said control means, follow-up means connected to said surface and to said linkage to deenergize said power-operated means when said surface moves to a position corresponding to any particular manual setting of said linkage, a primary supply of power and an emergency supply of power, said emergency power supply being normally inactive, two primary power feed lines connected between said control means and said primary power supply, two emergency power feed lines connected to said emergency power supply, the first of said emergency feed lines connected to the first of said primary feed lines by selector means operable to connect either, but not both, of said first feed lines to said control means, the second of said emergency feed lines connected to the second of said primary feed lines at a junction, isolating means attached in each of said second feed lines on the opposite side of said junction from said control means to isolate operating power in each second feed line from power in the other, an emergency control circuit connected to said emergency power supply and to said selector means to simultaneously activate said emergency power supply and move said selector means to connect said first emergency feed line to said control means, when said circuit is completed, said circuit including manual closure means and automatic closure means in series so that both said closure means must be closed to complete said circuit, said automatic closure means having a driven connection with said linkage to be closed when said linkage is in a position requiring control surface movement, and open when said control surface is in the position called for by said linkage, whereby said emergency power supply can drive said control surface, in accordance with said control means, when said manual closure means is closed, to the exclusion of said primary power supply.

14. An aircraft control system comprising a control surface to be moved, a hydraulic motor connected to move said surface in either of two directions when energized, a four-way hydraulic control valve connected to energize said hydraulic motor in either of said directions from a source of hydraulic fluid under pressure, a manual linkage connected to operate said four-way valve, a primary hydraulic power system having a pressure line and a return line normally connected to said four-way valve for movement of said surface, follow-up means connected to said surface and to said linkage to deenergize said hydraulic motor when said surface moves to a position corresponding to any particular manual setting of said linkage, an emergency hydraulic power system comprising means for carrying a separate self-contained supply of fluid, emergency pressure and return lines, a fluid pump in said emergency pressure line, and an electric motor connected to drive said pump, when said electric motor is energized, a pair of normally open electrical control switches connected in parallel with each other and located so that one of said control switches will be closed by mechanical means when said linkage moves said four-way valve to energize said hydraulic motor in either of said directions, said control switches being normally disconnected from said electric motor, a manual selector switch electrically wired to operatively connect said control switches in series with said electric motor at will, the primary system pressure line and the emergency system pressure line connected with each other at a junction and having a check valve in each of the two latter lines positioned to block fluid flow from said junction into each of said pressure lines, and an electrically operated hydraulic shuttle valve to which the primary system return line and the emergency system return line are connected, said shuttle valve positioned to direct all fluid flow from said control valve into said primary return line when said shuttle valve is deenergized and to direct all fluid flow from said control valve into said emergency return line when said shuttle valve is electrically energized, said shuttle valve being also wired in series with said control switches, whereby when said selector switch is closed and said linkage closes either of said control switches, said emergency system will be energized and operatively connected to said four-way valve so that no fluid from said emergency system is admitted to said primary system.

THOMAS A. FEENEY.
JOHN E. GLENN.
WALTER B. DEGENFELDER.
RONALD E. CRANDALL.
HERBERT S. RIPLEY.

References Cited in the file of this patent

UNITED STATES PATENTS

| Number | Name | Date |
|---|---|---|
| 1,165,811 | Stafford | Dec. 28, 1915 |
| 1,365,347 | Schneider | Jan. 11, 1921 |
| 1,847,693 | Kindervater | Mar. 1, 1932 |
| 2,017,086 | Zouck | Oct. 15, 1935 |
| 2,071,177 | Puffer | Feb. 16, 1937 |
| 2,140,037 | Swisher | Dec. 13, 1938 |
| 2,203,057 | Moore | June 4, 1940 |
| 2,312,686 | Campbell | Mar. 2, 1943 |
| 2,376,731 | Stoner | May 22, 1945 |
| 2,522,284 | Lecarme | Sept. 12, 1950 |